United States Patent
Mori et al.

(10) Patent No.: US 9,761,876 B2
(45) Date of Patent: Sep. 12, 2017

(54) ENERGY STORAGE DEVICE AND ENERGY STORAGE UNIT

(71) Applicant: GS Yuasa International Ltd., Kyoto-shi (JP)

(72) Inventors: Sumio Mori, Kyoto (JP); Kenta Nakai, Kyoto (JP); Akihiko Miyazaki, Kyoto (JP); Tomonori Kako, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 176 days.

(21) Appl. No.: 14/094,247

(22) Filed: Dec. 2, 2013

(65) Prior Publication Data

US 2014/0154557 A1   Jun. 5, 2014

(30) Foreign Application Priority Data

Dec. 4, 2012   (JP) ................................ 2012-265698
Nov. 18, 2013   (JP) ................................ 2013-238248

(51) Int. Cl.
- *H01M 4/587* (2010.01)
- *H01M 10/0525* (2010.01)
- *H01M 4/133* (2010.01)
- *H01M 2/26* (2006.01)
- *H01M 4/13* (2010.01)

(Continued)

(52) U.S. Cl.
CPC ............ *H01M 4/587* (2013.01); *H01M 2/26* (2013.01); *H01M 2/263* (2013.01); *H01M 4/13* (2013.01); *H01M 4/133* (2013.01); *H01M 10/0525* (2013.01); *H01M 10/0567* (2013.01);

(Continued)

(58) Field of Classification Search
CPC ....................................................... H01M 4/587
See application file for complete search history.

(56) References Cited

U.S. PATENT DOCUMENTS 7,608,364 B2   10/2009   Nishiyama et al.
7,615,314 B2   11/2009   Kawakami et al.
(Continued)

FOREIGN PATENT DOCUMENTS

EP   2 657 947 A1   10/2013
EP   2 741 355 A2   6/2014
(Continued)

OTHER PUBLICATIONS

Extended European Search Report dated Mar. 9, 2015.
Extended European Search Report dated Mar. 2, 2015 in European Patent Application No. 14186562.6.

*Primary Examiner* — Alex Usyatinsky
(74) *Attorney, Agent, or Firm* — McGinn IP Law Group, PLLC.

(57) ABSTRACT

An energy storage device including a positive electrode, a negative electrode, a separator disposed between the positive electrode and the negative electrode, and a non-aqueous electrolyte, wherein the negative electrode includes a negative electrode active material layer containing a non-graphitizable carbon as a negative electrode active material, and the negative electrode active material has a negative electrode active material weight per unit volume of the negative electrode active material layer of 0.92 g/cc or more and 1.13 g/cc or less and a particle size D90 of 4.3 μm or more and 11.5 μm or less, the particle size D90 being a particle size in particle size distribution in which a cumulative volume is 90%.

10 Claims, 10 Drawing Sheets

(51) Int. Cl.
*H01M 4/02* (2006.01)
*H01M 10/0567* (2010.01)
(52) U.S. Cl.
CPC ...... *H01M 2004/021* (2013.01); *Y02E 60/122* (2013.01); *Y02T 10/7011* (2013.01)

(56) References Cited

U.S. PATENT DOCUMENTS

| | | | |
|---|---|---|---|
| 7,803,199 B2 | 9/2010 | Kawakami et al. | |
| 8,574,533 B2 | 11/2013 | Sonobe et al. | |
| 2003/0134201 A1* | 7/2003 | Sato | H01M 10/0525 429/231.8 |
| 2004/0062995 A1* | 4/2004 | Yanagida | H01M 4/131 429/331 |
| 2004/0170898 A1* | 9/2004 | Shibuya | H01M 2/0212 429/231.8 |
| 2009/0140214 A1 | 6/2009 | Sonobe et al. | |
| 2010/0323241 A1 | 12/2010 | Kawakami et al. | |
| 2011/0318655 A1 | 12/2011 | Kawasoe et al. | |
| 2013/0286545 A1 | 10/2013 | Kojima et al. | |

FOREIGN PATENT DOCUMENTS

| | | |
|---|---|---|
| JP | 2001-110405 A | 4/2001 |
| JP | 2003-142075 A | 5/2003 |
| JP | 2004-095306 A | 3/2004 |
| JP | 2004-235145 A | 8/2004 |
| JP | 2006-260904 A | 9/2006 |
| JP | 2007-134286 A | 5/2007 |
| JP | 2007-165061 A | 6/2007 |
| JP | 2007-335143 A | 12/2007 |
| JP | 2010-098020 A | 4/2010 |
| JP | 2010-114206 A | 5/2010 |
| JP | 2014-132563 A | 7/2014 |
| WO | WO 2005/098998 A | 10/2005 |
| WO | WO 2012/086340 A1 | 6/2012 |

* cited by examiner

FIG. 4
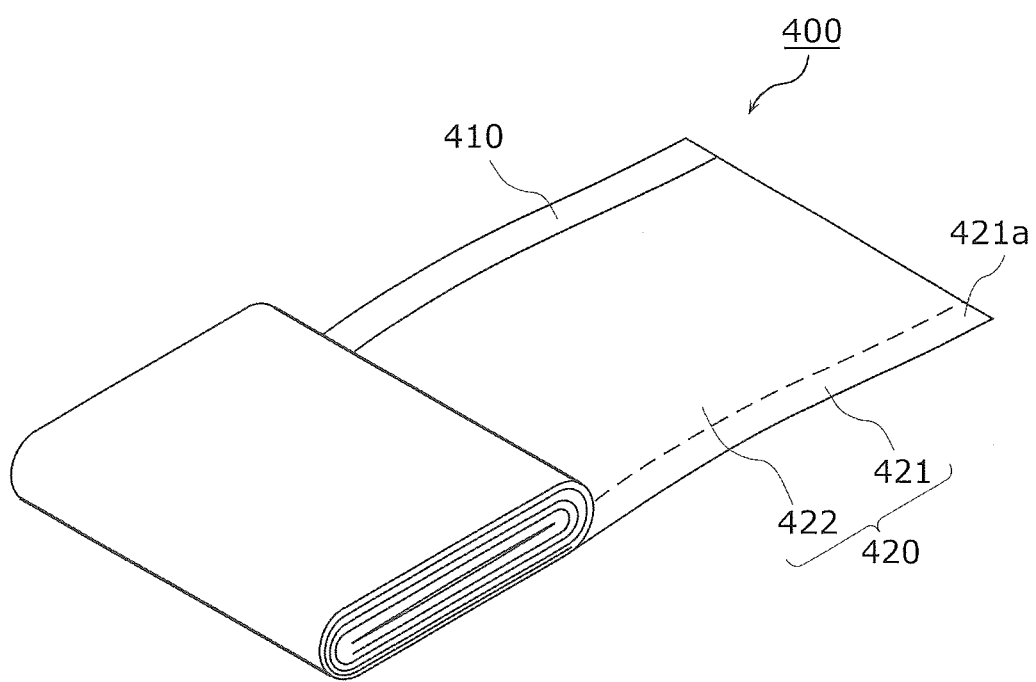
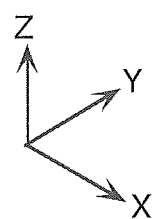

ENERGY STORAGE DEVICE AND ENERGY STORAGE UNIT

CROSS REFERENCE TO RELATED APPLICATIONS

The present application is based on and Claims priority of Japanese Patent Application No. 2012-265698 filed on Dec. 4, 2012 and Japanese Patent Application No. 2013-238248 filed on Nov. 18, 2013. The entire disclosure of the above-identified application, including the specification, drawings and Claims is incorporated herein by reference in its entirety.

FIELD

The present invention relates to an energy storage device including a positive electrode, a negative electrode, a separator disposed between the positive electrode and the negative electrode, and a non-aqueous electrolyte, and an energy storage unit including a plurality of the energy storage devices.

BACKGROUND

To solve recent global environmental issues, the shift from gasoline vehicles to hybrid electric vehicles and electric vehicles has been promoted and the use of electric bicycles has been increased. A variety of energy storage devices such as lithium ion secondary batteries are widely used in these applications. For this reason, energy storage devices having a higher output have been demanded.

To meet this demand, an energy storage device that attains a higher output by use of non-graphitizable carbon as a negative electrode active material has been proposed in the related art (see Patent Literature 1: WO2005/098998). The increased output in the energy storage device is attained by use of a non-graphitizable carbon having an average particle size D50 of 1 to 20 µm (preferably 4 to 15 µm) as a negative electrode active material to be formed into a negative electrode.

SUMMARY

An object of the present invention is to provide an energy storage device and energy storage unit that can attain an increased output and high durability.

To achieve the object above, the energy storage device according to one aspect of the present invention is an energy storage device including a positive electrode, a negative electrode, a separator disposed between the positive electrode and the negative electrode, and a non-aqueous electrolyte, wherein the negative electrode includes a negative electrode active material layer containing a non-graphitizable carbon as a negative electrode active material, and the negative electrode active material has a negative electrode active material weight per unit volume of the negative electrode active material layer of 0.92 g/cc or more and 1.13 g/cc or less and a particle size D90 of 4.3 µm or more and 11.5 µm or less, the particle size D90 being a particle size in particle size distribution in which a cumulative volume is 90%.

BRIEF DESCRIPTION OF DRAWINGS

These and other objects, advantages and features of the invention will become apparent from the following description thereof taken in conjunction with the accompanying drawings that illustrate a specific embodiment of the present invention.

FIG. 4 is a diagram showing a winding state of the electrode assembly according to the embodiment of the present invention which is partially developed.

DESCRIPTION OF EMBODIMENTS

Figure 1:
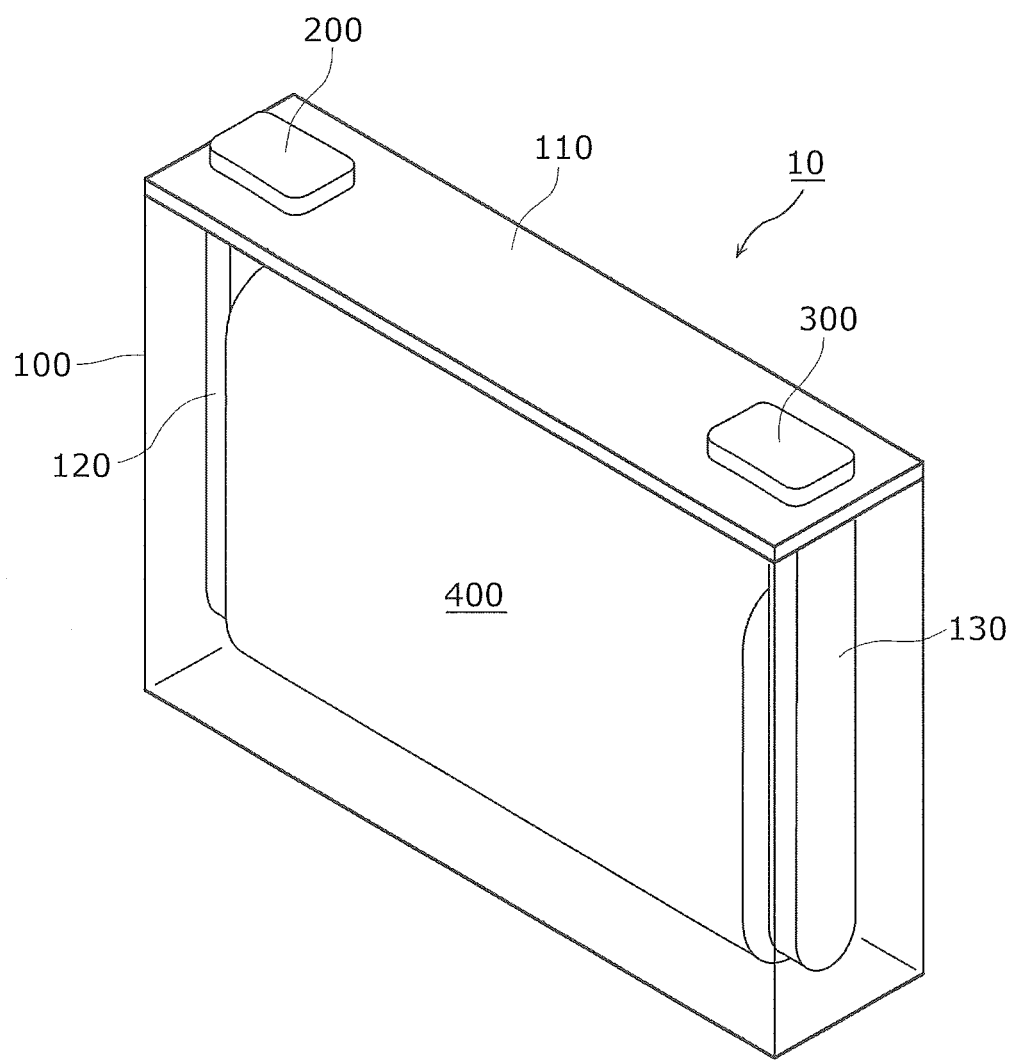
FIG. 1 is a perspective view showing an appearance of an energy storage device according to an embodiment of the present invention.

The present inventors found that if the particle size of non-graphitizable carbon is reduced to about several micrometers in terms of the average particle size D50, the output can be effectively increased but durability will undesirably reduce. Namely, the conventional energy storage device has such a problem of reduced durability when a non-graphitizable carbon having such a small particle size is used as the negative electrode active material to increase the output.

The present invention has been made to solve the problem above, and an object of the present invention is to provide an energy storage device and energy storage unit that can attain an increased output and high durability.

To achieve the object above, the energy storage device according to one aspect of the present invention is an energy storage device including a positive electrode, a negative electrode, a separator disposed between the positive electrode and the negative electrode, and a non-aqueous electrolyte, wherein the negative electrode includes a negative electrode active material layer containing a non-graphitizable carbon as a negative electrode active material, and the negative electrode active material has a negative electrode active material weight per unit volume of the negative electrode active material layer (density of the negative electrode active material) of 0.92 g/cc or more and 1.13 g/cc or less and a particle size D90 of 4.3 µm or more and 11.5 µm or less, the particle size D90 being a particle size in particle size distribution in which a cumulative volume is 90%.

According to this, as a result of intensive research, the present inventors found that an increased output and high durability can be attained when the non-graphitizable carbon is used as the negative electrode active material, the density of the negative electrode active material is controlled to be 0.92 g/cc or more and 1.13 g/cc or less, and the particle size D90 is controlled to be 4.3 µm or more and 11.5 µm or less. Namely, an excessively reduced density of the negative electrode active material will significantly reduce the capacity and output due to degradation, thereby reducing durability. An excessively increased density of the negative electrode active material will cause wrinkles in a negative electrode, leading to difficulties in production of an electrode assembly. When the negative electrode having wrinkles is used to produce the electrode assembly, durability will also reduce. Thus, by controlling the density of the negative electrode active material within a suitable range, high durability can be attained while an increased capacity and output are kept. Moreover, an excessively reduced particle size of the negative electrode active material will significantly reduce the capacity and output due to degradation, thereby reducing durability. Numbers of coarse particles contained in the negative electrode active material will become pillars to cause insufficient contact between the negative electrode active materials of such a reduced particle size when the positive electrode, the negative electrode, and the separator are stacked and pressed to reduce the thickness of the layer. The insufficient contact will reduce the output. Thus, by controlling the particle size D90 of the negative electrode active material within a suitable range, high durability can be attained while an increased capacity and output are kept.

Moreover, the relation $A1=-0.014 \times B1+C1$ (where $4.3 \leq B1 \leq 8.5$, and $1.04 \leq C1 \leq 1.20$) may be satisfied wherein the negative electrode active material weight per unit volume of the negative electrode active material layer (density of the negative electrode active material) is A1 g/cc.

According to this, as a result of intensive research, the present inventors found that when the density of the negative electrode active material and the particle size D90 satisfy the relation, a more increased output and higher durability can be attained. Namely, higher durability can be attained while a more increased capacity and higher output are kept wherein the particle size D90 of the negative electrode active material is in the range of 4.3 µm or more and 8.5 µm or less and the particle size D90 is 4.3 µm and the density of the negative electrode active material is 0.98 g/cc or more and 1.13 g/cc or less, the particle size D90 is 6.5 µm and the density is 0.95 g/cc or more and 1.10 g/cc or less, and the particle size D90 is 8.5 µm and the density is 0.92 g/cc or more and 1.07 g/cc or less.

Moreover, the negative electrode active material may have a particle size D50 of 2.7 µm or more and 5.9 µm or less, the particle size D50 being a particle size in particle size distribution in which the cumulative volume is 50%.

According to this, when the particle size D90 of the negative electrode active material is 4.3 µm or more and 11.5 µm or less, the particle size D50 is 2.7 µm or more and 5.9 µm or less. Then, at a particle size D50 in the range above, an increased output and high durability can be attained.

Moreover, the relation $A2=-0.003 \times B2+C2$ (where $2.7 \leq B2 \leq 4.6$, and $1.05 \leq C2 \leq 1.21$) may be satisfied wherein the negative electrode active material weight per unit volume of the negative electrode active material layer (density of the negative electrode active material) is A2 g/cc.

According to this, when the particle size D90 of the negative electrode active material is 4.3 µm or more and 8.5 µm or less, the particle size D50 is 2.7 µm or more and 4.6 µm or less. Then, when the density of the negative electrode active material and the particle size D50 satisfy the relation above, a more increased output and higher durability can be attained. Namely, higher durability can be attained while a more increased capacity and output are kept wherein the particle size D50 is in the range of 2.7 µm or more and 4.6 µm or less and the particle size D50 is 2.7 µm and the density of the negative electrode active material is 0.98 g/cc or more and 1.13 g/cc or less, the particle size D50 is 3.3 µm and the density is 0.95 g/cc or more and 1.10 g/cc or less, and the particle size D50 is 4.6 µm and the density is 0.92 g/cc or more and 1.07 g/cc or less.

The energy storage device may further include a negative electrode terminal, and a negative electrode current collector that electrically connects the negative electrode terminal to the negative electrode, wherein the negative electrode includes a region having no negative electrode active material layer in which the negative electrode active material layer is not formed, and the negative electrode current collector is joined to the region having no negative electrode active material layer to electrically connect the negative electrode terminal to the negative electrode.

According to this, the negative electrode current collector is joined to the region having no negative electrode active material layer to fix the negative electrode to the negative electrode current collector. When the density of the negative electrode active material is high, wrinkles are produced between a region having the negative electrode active material layer and the region having no negative electrode active material layer. According to the energy storage device, in contrast, by controlling the density of the negative electrode active material to fall within a suitable range, production of the wrinkles can be suppressed. As a result, the wrinkles to be produced in the negative electrode can be suppressed, avoiding difficulties to produce the electrode assembly due to wrinkles produced in the negative electrode.

Moreover, the non-aqueous electrolyte may contain an additive, and the additive is a coating forming material for forming a coating in a surface of the negative electrode.

According to this, the non-aqueous electrolyte includes the coating forming material for the negative electrode. Thereby, a more increased output and higher durability can be attained.

Moreover, the present invention can be implemented by an energy storage unit including a plurality of the energy storage devices.

Hereinafter, the energy storage device and energy storage unit according to the embodiment of the present invention will be described with reference to the drawings. The embodiment described below only exemplifies a preferred specific example of the present invention. Numeral values, shapes, materials, components, arrangements, positions, and connection forms of the components, and the like shown in the embodiments below are only examples, and will not limit to the present invention. Moreover, among the components of the embodiment below, the present invention the components not described in an independent Claim representing the most superordinate concept of the present invention will be described as arbitrary components that form a more preferred embodiment.

First, the configuration of an energy storage device 10 will be described.

Figure 2:
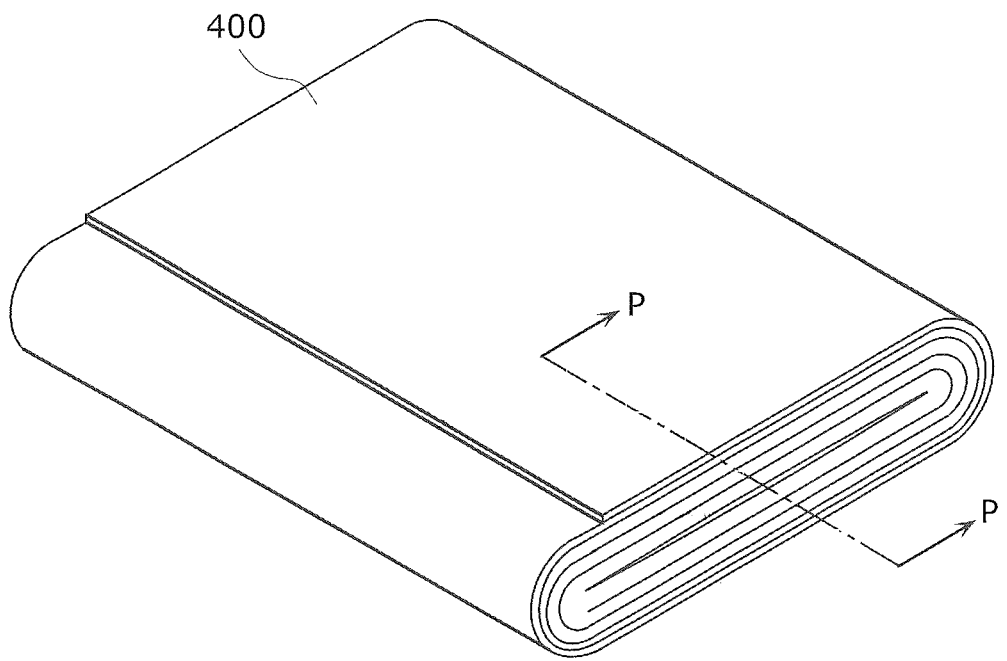
FIG. 2 is a perspective view showing a configuration of an electrode assembly according to the embodiment of the present invention.

FIG. 1 is a perspective view showing an appearance of an energy storage device 10 according to the embodiment of the present invention. The drawing perspectively illustrates the inside of a container. FIG. 2 is a perspective view showing the configuration of an electrode assembly 400 according to the embodiment of the present invention.

The energy storage device 10 is a secondary battery that can charge and discharge electricity, and more specifically is a non-aqueous electrolyte secondary battery such as lithium ion secondary batteries. Particularly, the energy storage device 10 can be used for hybrid electric vehicles (HEV) that perform high-rate cycle charge and discharge of 8 CA or more (capacity: 5 Ah, current at cycles: approximately 40 A). The energy storage device 10 will not be limited to the non-aqueous electrolyte secondary battery. The energy storage device 10 may be a secondary battery other than the non-aqueous electrolyte secondary battery or may be a capacitor.

As shown in these drawings, the energy storage device 10 includes a container 100, a positive electrode terminal 200, and a negative electrode terminal 300. The container 100 includes a cover plate 110 that is the top wall of the container. The container 100 accommodates an electrode assembly 400, a positive electrode current collector 120, and a negative electrode current collector 130. The container 100 of the energy storage device 10 contains a liquid such as an electrolyte solution (non-aqueous electrolyte) and is sealed, but the liquid is not illustrated in the drawing.

The container 100 is composed of a metallic housing body having a prismatic shape with a bottom and a metallic cover plate 110 that closes the opening of the housing body. The electrode assembly 400 and other components are accommodated in the container 100, and the cover plate 110 is welded to the housing body, for example. Thus, the container can be sealed.

The electrode assembly 400 includes a positive electrode, a negative electrode, and a separator, and can store electricity. Specifically, the electrode assembly 400 is formed by stacking the negative electrode and the positive electrode with the separator being interposed, and winding the stacked component into an oblong shape as illustrated in FIG. 2. In the drawing, the shape of the electrode assembly 400 is illustrated as an oblong shape, but the shape may be a circular or oval shape. The form of the electrode assembly 400 is not limited to a winding type, and may be a form of stacked flat electrode plates (stacking type). The detailed configuration of the electrode assembly 400 will be described later.

The positive electrode terminal 200 is an electrode terminal electrically connected to the positive electrode in the electrode assembly 400. The negative electrode terminal 300 is an electrode terminal electrically connected to the negative electrode in the electrode assembly 400. Namely, the positive electrode terminal 200 and the negative electrode terminal 300 are metallic electrode terminals for flowing the electricity stored in the electrode assembly 400 to an external space from the energy storage device 10 and flowing electricity into the internal space of the energy storage device 10 to store electricity in the electrode assembly 400.

The positive electrode current collector 120 is disposed between the positive electrode in the electrode assembly 400 and a side wall of the container 100. The positive electrode current collector 120 is a conductive and rigid member electrically connected to the positive electrode terminal 200 and the positive electrode in the electrode assembly 400. The positive electrode current collector 120 as well as a positive electrode base material layer in the electrode assembly 400 described later is formed of aluminum. The negative electrode current collector 130 is disposed between the negative electrode in the electrode assembly 400 and a side wall of the container 100. The negative electrode current collector 130 is a conductive and rigid member electrically connected to the negative electrode terminal 300 and the negative electrode in the electrode assembly 400. The negative electrode current collector 130 as well as a negative electrode base material layer in the electrode assembly 400 described later is formed of copper.

A variety of non-aqueous electrolytes (electrolyte solutions) to be sealed within the container 100 can be selected. Examples of organic solvents for the non-aqueous electrolyte include non-aqueous solvents, that is, ethylene carbonate, propylene carbonate, butylene carbonate, trifluoropropylene carbonate, γ-butyrolactone, γ-valerolactone, sulfolane, 1,2-dimethoxyethane, 1,2-diethoxy ethane, tetrahydrofuran, 2-methyltetrahydrofuran, 2-methyl-1,3-dioxolane, dioxolane, fluoroethyl methyl ether, ethylene glycol diacetate, propylene glycol diacetate, ethylene glycol dipropionate, propylene glycol dipropionate, methyl acetate, ethyl acetate, propyl acetate, butyl acetate, methyl propionate, ethyl propionate, propyl propionate, dimethyl carbonate, diethyl carbonate, ethyl methyl carbonate, methyl propyl carbonate, ethyl propyl carbonate, dipropyl carbonate, methyl isopropyl carbonate, ethyl isopropyl carbonate, diisopropyl carbonate, dibutyl carbonate, acetonitrile, fluoroacetonitrile, alkoxy- and halogen-substituted cyclic phosphazenes or linear phosphazenes such as ethoxypentafluorocyclotriphosphazene, diethoxytetrafluorocyclotriphosphazene, and phenoxypentafluorocyclotriphosphazene, phosphoric acid esters such as triethyl phosphate, trimethyl phosphate, and trioctyl phosphate, boric acid esters such as triethyl borate and tributyl borate, and N-methyloxazolidinone, and N-ethyloxazolidinone. When a solid electrolyte is used, a porous polymer solid electrolyte membrane is used as a polymer solid electrolyte, and the polymer solid electrolyte may further contain an electrolyte solution. When a gel polymer solid electrolyte is used, an electrolyte solution that forms the gel may be different from an electrolyte solution contained in pores and the like. When a high output is required as in the HEV application, use of the non-aqueous electrolyte alone is more preferred to use of the solid electrolyte or the polymer solid electrolyte.

Examples of non-aqueous electrolyte salts include, but not particularly limited to, ionic compounds such as $LiClO_4$, $LiBF_4$, $LiAsF_6$, $LiPF_6$, $LiCF_3SO_3$, $LiN(SO_2CF_3)_2$, $LiN(SO_2C_2F_5)_2$, $LiN(SO_2CF_3)(SO_2C_4F_9)$, LiSCN, LiBr, LiI, $Li_2SO_4$, $Li_2B_{10}Cl_{10}$, $NaClO_4$, NaI, NaSCN, NaBr, $KClO_4$, and KSCN and mixtures of two or more thereof.

In the energy storage device 10, these organic solvents and non-aqueous electrolyte salts are used in combination as the non-aqueous electrolyte solution. Among these non-aqueous electrolytes, use of a mixture of propylene carbonate, dimethyl carbonate, and methyl ethyl carbonate is preferred because lithium ions have maximum conductivity.

Desirably, the non-aqueous electrolyte includes an additive which is a coating forming material for forming a coating on the surface of the negative electrode. Examples of the additive include lithium difluorobisoxalatophosphate represented by Formula (1) below ($LiPF_2(Ox)_2$, LiFOP), lithium tetrafluorooxalatophosphate represented by Formula (2) below (LiPF$_4$(Ox), LiFOP), lithium bisoxalatoborate represented by Formula (3) (LiBOB), lithium difluorooxalatoborate represented by Formula (4) below (LiFOB), vinylene carbonate (VC), and fluoroethylene carbonate (FEC). Additional examples thereof include cyclic sultone compounds whose structures have a double bond such as propane sultone, propene sultone, glycol sulfate, and bis (vinylsulfonyl)methane, cyclic sulfuric acid ester compounds, linear sulfur compounds, and analogs thereof. For the additives, these compounds exemplified above may be used alone or in combination.

[Formula 1]

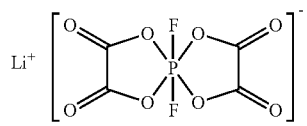

(1)

[Formula 2]

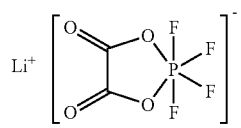

(2)

[Formula 3]

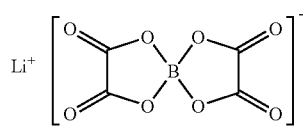

(3)

[Formula 4]

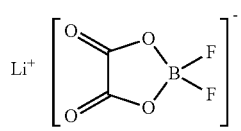

(4)

Next, a detailed configuration of the electrode assembly 400 will be described.

Figure 3:
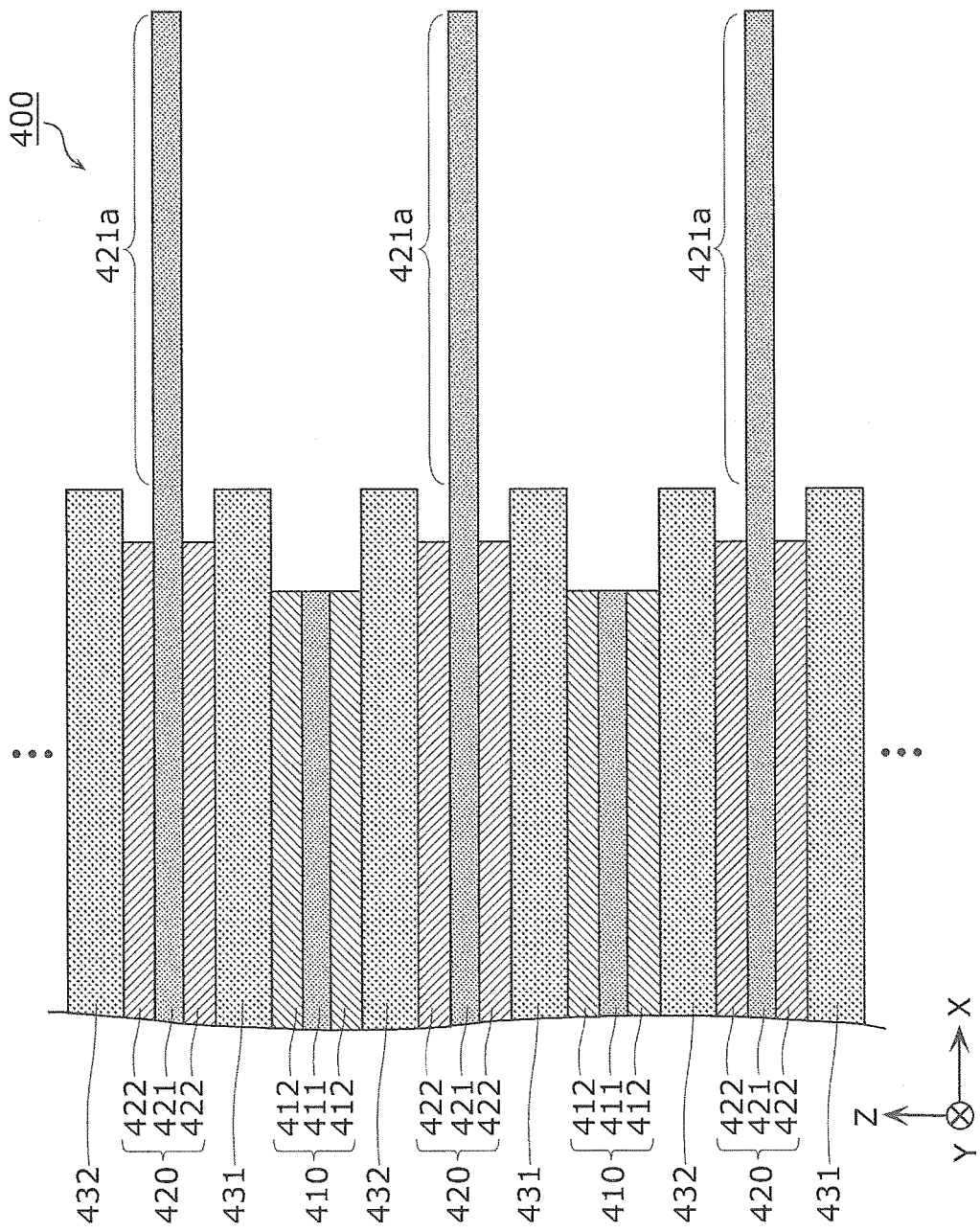
FIG. 3 is a sectional view showing a configuration of the electrode assembly according to the embodiment of the present invention.

FIG. 3 is a sectional view showing the configuration of the electrode assembly 400 according to the embodiment of the present invention. Specifically, FIG. 3 is an enlarged view showing a cross section of the electrode assembly 400 shown in FIG. 2, the cross section being taken along the line P-P. FIG. 4 is a diagram showing the winding state of the electrode assembly 400 according to the embodiment of the present invention which is partially developed. In FIG. 4, the separator is not shown for convenience for description.

As shown in these diagrams, the electrode assembly 400 is formed by stacking a positive electrode 410, a negative electrode 420, and two separators 431 and 432. Specifically, the positive electrode 410, the negative electrode 420, and the separator 431 or 432 are stacked with the separator being disposed between the positive electrode 410 and the negative electrode 420.

The positive electrode 410 includes a positive electrode base material layer 411 and a positive electrode active material layer 412. The negative electrode 420 includes a negative electrode base material layer 421 and a negative electrode active material layer 422.

The positive electrode base material layer 411 is a long, band-like conductive current collecting foil made of aluminum or an aluminum alloy. The negative electrode base material layer 421 is a long, band-like conductive current collecting foil made of copper or a copper alloy. For the current collecting foil, known materials such as nickel, iron, stainless steel, titanium, fired carbon, conductive polymers, conductive glass, and Al—Cd alloys can also be used properly.

The positive electrode active material layer 412 is an active material layer formed on a surface of the positive electrode base material layer 411 (in FIG. 3, both surfaces in the plus direction and minus direction in the Z-axis). The positive electrode active material layer 412 contains a positive electrode active material.

Here, a known material can be properly used as the positive electrode active material used for the positive electrode active material layer 412 as long as the material is a positive electrode active material that can occlude and release lithium ions. For example, the positive electrode active material can be selected from composite oxides represented by Li$_x$MO$_y$ (wherein M represents at least one transition metal) (such as Li$_x$CoO$_2$, Li$_x$NiO$_2$, Li$_x$Mn$_2$O$_4$, Li$_x$MnO$_3$, Li$_x$Ni$_y$Co$_{(1-y)}$O$_2$, Li$_x$Ni$_y$Mn$_z$Co$_{(1-y-z)}$O$_2$, and Li$_x$Ni$_y$Mn$_{(2-y)}$O$_4$); or polyanion compounds represented by Li$_w$Me$_x$(XO$_y$)$_z$ (wherein Me represents at least one transition metal, and X is P, Si, B, or V, for example) (such as LiFePO$_4$, LiMnPO$_4$, LiNiPO$_4$, LiCoPO$_4$, Li$_3$V$_2$(PO$_4$)$_3$, Li$_2$MnSiO$_4$, and Li$_2$CoPO$_4$F). The element or polyanion in these compounds may be partially substituted by an element other than the element or anionic species, and the surface thereof may be coated with a metal oxide such as ZrO$_2$, MgO, and Al$_2$O$_3$ or carbon. Further, examples of the positive electrode active material include, but not limited to, conductive high-molecular compounds such as disulfide, polypyrrole, polyaniline, poly(para-styrene), polyacetylene, and polyacene materials; and pseudo-graphite structure carbonaceous materials. These compounds may be used alone or in combination.

The negative electrode active material layer 422 is an active material layer formed on a surface of the negative electrode base material layer 421 (in FIG. 3, both surfaces in the plus direction and minus direction in the Z-axis). Here, a non-graphitizable carbon (hard carbon) is used as the negative electrode active material included in the negative electrode active material layer 422.

Specifically, the negative electrode active material included in the negative electrode active material layer 422 (non-graphitizable carbon) has a negative electrode active material weight per unit volume of the negative electrode active material layer 422 (density of the negative electrode active material) of 0.92 g/cc or more and 1.13 g/cc or less and a particle size D90 of 4.3 μm or more and 11.5 μm or less, the particle size D90 being a particle size in particle size distribution in which the cumulative volume is 90%. More specifically, the relation (hereinafter referred to Mathematical Relation 1) is preferably satisfied wherein A1=−0.014×B1+C1 (where 4.3≤B1≤8.5, and 1.04≤C1≤1.20) wherein the negative electrode active material weight per unit volume of the negative electrode active material layer (density of the negative electrode active material) is A1 g/cc and the particle size D90 of the negative electrode active material is B1 μm.

Alternatively, the negative electrode active material included in the negative electrode active material layer 422 preferably has a particle size D50 of 2.7 μm or more and 5.9 μm or less, the particle size D50 being a particle size in particle size distribution in which the cumulative volume is 50%. More preferably, the relation (hereinafter referred to as Mathematical Relation 2) A2=−0.003×B2+C2 is satisfied (where 2.7≤B2≤4.6, and 1.05≤C2≤1.21) wherein the negative electrode active material weight per unit volume of the negative electrode active material layer (density of the negative electrode active material) is A2 g/cc and the particle size D50 of the negative electrode active material is B2 μm. The details will be described later.

The particle size D50 is an average particle size (also referred to as a median diameter) when the volume cumulative distribution is plotted from the smallest particle size in the particle size distribution of the particle size, and the volume cumulative frequency is 50%. More specifically, the particle size D50 is a particle size when a powder is divided into two based on the particle size, and the powder having a large particle size is equivalent to that having a small particle size. The particle size D90 is a particle size having a volume cumulative frequency of 90% in the particle size distribution.

In other words, the particle size D50 represents a particle size (D50) at a volume of 50% in terms of the volume of the particle measured by laser diffraction scattering. Similarly, the particle size D90 represents a particle size (D90) at a volume of 90% in terms of the volume measured by laser diffraction scattering.

The negative electrode 420 has a region having no negative electrode active material layer 421a in which the negative electrode active material layer 422 is not formed. The region having no negative electrode active material layer 421a is a portion of the negative electrode base material layer 421 in which no negative electrode active material layer 422 is not formed. Specifically, the region having no negative electrode active material layer 421a is disposed at one end of the negative electrode base material layer 421 (the end in the plus direction of the X-axis). A plurality of regions having no negative electrode active material layer 421a is joined to the negative electrode current collector 130 to electrically connect the negative electrode terminal 300 to the negative electrode 420.

Similarly, the positive electrode 410 has a region having no positive electrode active material in which the positive electrode active material layer 412 is not formed, and the region having no positive electrode active material is disposed at the end in the minus direction of the X-axis. A plurality of regions having no positive electrode active material is joined to the positive electrode current collector 120 to electrically connect the positive electrode terminal 200 to the positive electrode 410.

The separators 431 and 432 are microporous sheets made of a resin, and impregnated with a non-aqueous electrolyte containing an organic solvent and an electrolyte salt. Here, for the separators 431 and 432, woven fabrics, non-woven fabrics, and synthetic resin microporous membranes made of a polyolefin resin such as polyethylene are used. These are insoluble in the organic solvent. The separators 431 and 432 may be those formed of layers of microporous membranes having different materials, weight average molecular weights, or porosity rates, microporous membranes containing a proper amount of an additive such as a variety of a plasticizer, an antioxidant, and a flame retardant, or microporous membranes having at least one surface thereof coated with an inorganic oxide such as silica. Particularly, synthetic resin microporous membranes can be suitably used. Among these, polyolefin microporous membranes such as microporous membranes made of polyethylene and polypropylene, microporous membranes made of polyethylene and polypropylene formed into a composite with aramide or polyimide, and microporous membranes made of composites of thereof are suitably used for their thickness, membrane strength, and membrane resistance.

The positive electrode 410 or negative electrode 420 contains a binder. For the binder, a known material such as an aqueous binder or a binder for an organic solvent can be properly used. Use of a fluorinated resin is suitable because high electrode density and durability are attained. The amount is 3 to 12% by weight, and more preferably 5 to 8% by weight based on the entire negative electrode paste.

Namely, the positive electrode active material layer 412 includes the positive electrode active material and the binder, and the negative electrode active material layer 422 includes the negative electrode active material and the binder. In other words, the positive electrode active material or negative electrode active material is defined as a material left by excluding the binder from the positive electrode active material layer 412 or negative electrode active material layer 422. The positive electrode active material and the negative electrode active material include no binder.

Next, the thus-configured energy storage device 10 enabling higher output and higher durability will be described in detail.

Examples

First, the method of producing the energy storage device 10 will be described. Specifically, batteries were produced as energy storage devices in the following manner in Examples 1 to 23 and Comparative Examples 1 to 25 described later. Examples 1 to 23 all are concerned with the energy storage device 10 according to the embodiment.

(1-1) Production of Positive Electrode $LiNi_{1/3}Co_{1/3}Mn_{1/3}O_2$ was used as the positive electrode active material, acetylene black was used as a conductive aid, and polyvinylidene fluoride (PVDF (registered trademark)) was used as the binder. Using N-methyl-2-pyrrolidone (NMP) as the solvent, 4.5% by weight of the conductive aid, 4.5% by weight of the binder, and 91% by weight of the positive electrode active material were mixed, and kneaded to prepare a positive electrode paste. The prepared positive electrode paste was applied at a weight of 6.9 mg/cm$^2$ onto an aluminum foil having a thickness of 15 μm. The applied portion had a width of 83 mm, and the non-applied portion (region having no positive electrode active material) had a width of 11 mm. After the applied positive electrode paste was dried, the workpiece was roll pressed to adjust the active material filling density in the positive electrode active material layer to be 2.48 g/cc. The workpiece was vacuum dried to remove moisture.

(1-2) Production of Negative Electrode

As the negative electrode active material, non-graphitizable carbons having particle sizes shown in Tables 1 and 2 below were used. PVDF (registered trademark) was used as the binder. Using NMP as the solvent, 7% by weight of the binder and 93% by weight of the negative electrode active material were mixed, and kneaded to prepare a negative electrode paste. The prepared negative electrode paste was applied at a weight of 3.3 mg/cm$^2$ onto a copper foil having a thickness of 8 μm. The applied portion had a width of 87 mm, and the non-applied portion (region having no negative electrode active material layer) had a width of 9 mm. After the applied negative electrode paste was dried, the workpiece was roll pressed to adjust the active material filling density in the negative electrode active material layer to be the active material density shown in Tables 1 and 2. The workpiece was vacuum dried to remove moisture.

The non-graphitizable carbon (hard carbon) can be distinguished from the graphitizable carbon (soft carbon) by firing the negative electrode active material, for example.

For example, the density of the negative electrode active material (active material density) is determined as follows. The negative electrode is extracted from the battery, and decomposed products of the electrolyte solution and unreleased lithium ions are removed from the negative electrode by washing with water, for example. Furthermore, the binder is removed by dissolving the binder in a solvent or heating the binder to a temperature at which the binder decomposes. Although the method is not limited to this, components other than the negative electrode active material are removed from the negative electrode active material layer as much as possible to separate the hard carbon (or negative electrode active material). Thus, only the hard carbon (or negative electrode active material) is extracted, and the negative electrode active material weight per unit volume of the negative electrode active material layer is measured. Thereby, the density of the separated negative electrode active material can be measured.

(1-3) Production of Separator

For the separator, a polyethylene microporous membrane having an air permeability of approximately 100 sec/100 cc and having a thickness of 21 μm was used.

(1-4) Preparation of Non-Aqueous Electrolyte

30% by volume of propylene carbonate, 40% by volume of dimethyl carbonate, and 30% by volume of ethyl methyl carbonate were mixed to prepare a solvent. In the mixed solvent, $LiPF_6$ was dissolved such that the concentration of salt was 1.2 mol/L. Further, 0.3% by weight of vinylene carbonate was added to the solution to prepare a non-aqueous electrolyte.

(1-5) Production of Battery

The positive electrode, the negative electrode, and the separator were stacked, and wound. The region having no positive electrode active material in the positive electrode was welded to the positive electrode current collector and the region having no negative electrode active material layer in the negative electrode was welded to the negative electrode current collector, and placed in the container. The container was welded to the cover plate, and the non-aqueous electrolyte was injected into the container. Then, the container was sealed.

Next, numeric values below were determined, and evaluation tests for the battery were performed.

(2-1) Capacity Check Test

The produced battery was charged for 3 hours in a 25° C. thermostat at a constant charge current of 5 A and a constant voltage of 4.2 V. After the charging was paused for 10 minutes, the battery was discharged to 2.4 V at a constant discharge current of 5 A. Thereby, the discharge capacity Q of the battery was measured.

(2-2) Low Temperature Output Check Test

The battery after the capacity check test was charged to 20% of the discharge capacity obtained by the capacity check test to adjust the State of Charge (SOC) of the battery to be 20%, and kept at −10° C. for 4 hours. Subsequently, the battery was discharged at a constant voltage of 2.3 V for 1 second, and the low temperature output P was calculated from the current value at 1 second.

(2-3) Charge and Discharge Cycle Test

To determine test conditions for the charge and discharge cycle test, the battery having an adjusted SOC of 50% was kept at 55° C. for 4 hours, and charged at a constant current of 40 A until the SOC reached 80%. Subsequently, the battery was discharged at a constant current of 40 A until the SOC changed from 80% to 20%. Thus, a charge voltage V80 at an SOC of 80% and a discharge voltage V20 at an SOC of 20% were determined.

A 55° C. cycle test was performed at a constant current of 40 A. A cut-off voltage during charging was defined as V80, and a cut-off voltage during discharging was defined as V20. The cycle test was performed continuously without defining a time for pause. The cycle time was 3000 hours in total. After the cycle test for 3000 hours was completed, the battery was kept at 25° C. for 4 hours. Then, the battery was subjected to the capacity check test and the low temperature output check test. The capacity reduction rate after the cycle test was calculated from the expression capacity reduction rate=100−Q2/Q1×100 wherein the capacity before the cycle test (initial capacity) was Q1 and the capacity after the cycle test (capacity after degradation) was Q2. Similarly, the output reduction rate was calculated from the expression output reduction rate=100−P2/P1×100 wherein the output before the cycle test (initial output) was P1 and the output after the cycle test (output after degradation) was P2.

Table 1 shows the thus-obtained initial capacity Q1, capacity after degradation Q2, and capacity reduction rate of the battery, and Table 2 shows the thus-obtained initial output P1, output after degradation P2, and output reduction rate of the battery. Namely, in Table 1, Examples 1 to 23 and Comparative Examples 1 to 25 are compared with respect to the initial capacity, capacity after degradation, and capacity reduction rate of the battery when the particle size D50 of the negative electrode active material (non-graphitizable carbon), the particle size D90, and the density of the negative electrode active material are varied. In Table 2, Examples 1 to 23 and Comparative Examples 1 to 25 are compared with respect to the initial output, output after degradation, and output reduction rate of the battery when the particle size D50 of the negative electrode active material (non-graphitizable carbon), the particle size D90, and the density of the negative electrode active material are varied.

For example, the negative electrode is extracted from the battery, and decomposed products of the electrolyte solution and unreleased lithium ions are removed from the negative electrode by washing with water. Furthermore, the binder is removed by dissolving the binder in a solvent or heating the binder to a temperature at which the binder decomposes. Although the method is not limited to this, components other than the negative electrode active material are removed from the negative electrode active material layer as much as possible to separate the hard carbon (or negative electrode active material). Then, the volume-based particle size at a cumulative volume (50% and 90%) of the obtained negative electrode active material is measured. Thus, the particle size D50 and the particle size D90 can be measured.

In "Wrinkles in negative electrode" of Tables 1 and 2, "Wrinkles" indicates cases where the negative electrode paste portion or the non-applied portion continuously disposed in the longitudinal direction (region having no negative electrode active material layer) in the negative electrode is significantly wrinkled by excessively pressing the negative electrode while "None" indicates cases where remarkable wrinkles are not found. Moreover, "Difficulties in production" in "Wrinkles in negative electrode" indicates cases where the electrode plate is more significantly wrinkled by more excessive press to cause difficulties in winding the electrode due to deviation in winding or when the electrode plate is difficult to press to a predetermined density.

TABLE 1

|  | Particle size D50 (μm) | Particle size D90 (μm) | Active material density (g/cc) | Wrinkles in negative electrode | Initial output (Ah) | Capacity after degradation (Ah) | Output reduction rate (%) |
|---|---|---|---|---|---|---|---|
| Comp. Ex. 1 | 2.1 | 3.7 | 0.92 | None | 4.54 | 3.13 | 31 |
| Comp. Ex. 2 | 2.1 | 3.7 | 0.95 | None | 4.59 | 3.30 | 28 |
| Comp. Ex. 3 | 2.1 | 3.7 | 0.98 | None | 4.62 | 3.37 | 27 |
| Comp. Ex. 4 | 2.1 | 3.7 | 1.01 | None | 4.71 | 3.49 | 26 |
| Comp. Ex. 5 | 2.1 | 3.7 | 1.04 | None | 4.73 | 3.55 | 25 |
| Comp. Ex. 6 | 2.1 | 3.7 | 1.07 | None | 4.79 | 3.59 | 25 |
| Comp. Ex. 7 | 2.1 | 3.7 | 1.10 | None | 4.83 | 3.72 | 23 |
| Comp. Ex. 8 | 2.1 | 3.7 | 1.13 | Wrinkles | 4.89 | 3.72 | 24 |
| Comp. Ex. 9 | 2.7 | 4.3 | 0.92 | None | 4.55 | 3.46 | 24 |
| Comp. Ex. 10 | 2.7 | 4.3 | 0.95 | None | 4.60 | 3.68 | 20 |
| Example 1 | 2.7 | 4.3 | 0.98 | None | 4.65 | 4.00 | 14 |
| Example 2 | 2.7 | 4.3 | 1.01 | None | 4.69 | 4.03 | 14 |
| Example 3 | 2.7 | 4.3 | 1.04 | None | 4.73 | 4.07 | 14 |
| Example 4 | 2.7 | 4.3 | 1.07 | None | 4.83 | 4.20 | 13 |
| Example 5 | 2.7 | 4.3 | 1.10 | None | 4.85 | 4.22 | 13 |
| Example 6 | 2.7 | 4.3 | 1.13 | Wrinkles | 4.90 | 4.17 | 15 |
| Comp. Ex. 11 | 3.3 | 6.5 | 0.92 | None | 4.54 | 3.59 | 21 |
| Example 7 | 3.3 | 6.5 | 0.95 | None | 4.63 | 3.94 | 15 |
| Example 8 | 3.3 | 6.5 | 0.98 | None | 4.65 | 4.00 | 14 |
| Example 9 | 3.3 | 6.5 | 1.01 | None | 4.72 | 4.06 | 14 |
| Example 10 | 3.3 | 6.5 | 1.04 | None | 4.75 | 4.13 | 13 |
| Example 11 | 3.3 | 6.5 | 1.07 | None | 4.81 | 4.18 | 13 |
| Example 12 | 3.3 | 6.5 | 1.10 | Wrinkles | 4.87 | 4.14 | 15 |
| Comp. Ex. 12 | 3.3 | 6.5 |  | * |  |  |  |
| Example 13 | 4.6 | 8.5 | 0.92 | None | 4.60 | 3.91 | 15 |
| Example 14 | 4.6 | 8.5 | 0.95 | None | 4.62 | 3.97 | 14 |
| Example 15 | 4.6 | 8.5 | 0.98 | None | 4.67 | 4.02 | 14 |
| Example 16 | 4.6 | 8.5 | 1.01 | None | 4.73 | 4.12 | 13 |
| Example 17 | 4.6 | 8.5 | 1.04 | None | 4.80 | 4.18 | 13 |
| Example 18 | 4.6 | 8.5 | 1.07 | Wrinkles | 4.83 | 4.11 | 15 |
| Comp. Ex. 13 | 4.6 | 8.5 |  | * |  |  |  |
| Comp. Ex. 14 | 4.6 | 8.5 |  | * |  |  |  |
| Example 19 | 5.9 | 11.5 | 0.92 | None | 4.59 | 3.67 | 20 |
| Example 20 | 5.9 | 11.5 | 0.95 | None | 4.62 | 3.74 | 19 |
| Example 21 | 5.9 | 11.5 | 0.98 | None | 4.67 | 3.83 | 18 |
| Example 22 | 5.9 | 11.5 | 1.01 | None | 4.72 | 3.87 | 18 |
| Example 23 | 5.9 | 11.5 | 1.04 | Wrinkles | 4.78 | 3.87 | 19 |
| Comp. Ex. 15 | 5.9 | 11.5 |  | * |  |  |  |
| Comp. Ex. 16 | 5.9 | 11.5 |  | * |  |  |  |
| Comp. Ex. 17 | 5.9 | 11.5 |  | * |  |  |  |
| Comp. Ex. 18 | 9.6 | 22.1 | 0.92 | None | 4.59 | 3.76 | 18 |
| Comp. Ex. 19 | 9.6 | 22.1 | 0.95 | None | 4.63 | 3.89 | 16 |
| Comp. Ex. 20 | 9.6 | 22.1 | 0.98 | None | 4.68 | 3.88 | 17 |
| Comp. Ex. 21 | 9.6 | 22.1 | 1.01 | Wrinkles | 4.74 | 3.89 | 18 |
| Comp. Ex. 22 | 9.6 | 22.1 |  | * |  |  |  |
| Comp. Ex. 23 | 9.6 | 22.1 |  | * |  |  |  |
| Comp. Ex. 24 | 9.6 | 22.1 |  | * |  |  |  |
| Comp. Ex. 25 | 9.6 | 22.1 |  | * |  |  |  |

*: Difficulties in production

TABLE 2

|  | Particle size D50 (μm) | Particle size D90 (μm) | Active material density (g/cc) | Wrinkles in negative electrode | Initial output (W) | Capacity after degradation (W) | Output reduction rate (%) |
|---|---|---|---|---|---|---|---|
| Comp. Ex. 1 | 2.1 | 3.7 | 0.92 | None | 433 | 147 | 66 |
| Comp. Ex. 2 | 2.1 | 3.7 | 0.95 | None | 442 | 199 | 55 |
| Comp. Ex. 3 | 2.1 | 3.7 | 0.98 | None | 441 | 203 | 54 |
| Comp. Ex. 4 | 2.1 | 3.7 | 1.01 | None | 450 | 221 | 51 |
| Comp. Ex. 5 | 2.1 | 3.7 | 1.04 | None | 452 | 221 | 51 |
| Comp. Ex. 6 | 2.1 | 3.7 | 1.07 | None | 557 | 284 | 49 |
| Comp. Ex. 7 | 2.1 | 3.7 | 1.10 | None | 464 | 246 | 47 |
| Comp. Ex. 8 | 2.1 | 3.7 | 1.13 | Wrinkles | 467 | 243 | 48 |
| Comp. Ex. 9 | 2.7 | 4.3 | 0.92 | None | 414 | 228 | 45 |
| Comp. Ex. 10 | 2.7 | 4.3 | 0.95 | None | 418 | 288 | 31 |
| Example 1 | 2.7 | 4.3 | 0.98 | None | 425 | 391 | 8 |
| Example 2 | 2.7 | 4.3 | 1.01 | None | 429 | 403 | 6 |
| Example 3 | 2.7 | 4.3 | 1.04 | None | 433 | 407 | 6 |
| Example 4 | 2.7 | 4.3 | 1.07 | None | 442 | 420 | 5 |
| Example 5 | 2.7 | 4.3 | 1.10 | None | 444 | 422 | 5 |

TABLE 2-continued

| | Particle size D50 (μm) | Particle size D90 (μm) | Active material density (g/cc) | Wrinkles in negative electrode | Initial output (W) | Capacity after degradation (W) | Output reduction rate (%) |
|---|---|---|---|---|---|---|---|
| Example 6 | 2.7 | 4.3 | 1.13 | Wrinkles | 446 | 415 | 7 |
| Comp. Ex. 11 | 3.3 | 6.5 | 0.92 | None | 370 | 285 | 23 |
| Example 7 | 3.3 | 6.5 | 0.95 | None | 377 | 351 | 7 |
| Example 8 | 3.3 | 6.5 | 0.98 | None | 381 | 366 | 4 |
| Example 9 | 3.3 | 6.5 | 1.01 | None | 385 | 373 | 3 |
| Example 10 | 3.3 | 6.5 | 1.04 | None | 388 | 380 | 2 |
| Example 11 | 3.3 | 6.5 | 1.07 | None | 392 | 384 | 2 |
| Example 12 | 3.3 | 6.5 | 1.10 | Wrinkles | 396 | 376 | 5 |
| Comp. Ex. 12 | 3.3 | 6.5 | | * | | | |
| Example 13 | 4.6 | 8.5 | 0.92 | None | 332 | 305 | 8 |
| Example 14 | 4.6 | 8.5 | 0.95 | None | 335 | 318 | 5 |
| Example 15 | 4.6 | 8.5 | 0.98 | None | 339 | 322 | 5 |
| Example 16 | 4.6 | 8.5 | 1.01 | None | 343 | 329 | 4 |
| Example 17 | 4.6 | 8.5 | 1.04 | None | 348 | 334 | 4 |
| Example 18 | 4.6 | 8.5 | 1.07 | Wrinkles | 348 | 324 | 7 |
| Comp. Ex. 13 | 4.6 | 8.5 | | * | | | |
| Comp. Ex. 14 | 4.6 | 8.5 | | * | | | |
| Example 19 | 5.9 | 11.5 | 0.92 | None | 319 | 278 | 13 |
| Example 20 | 5.9 | 11.5 | 0.95 | None | 322 | 283 | 12 |
| Example 21 | 5.9 | 11.5 | 0.98 | None | 327 | 294 | 10 |
| Example 22 | 5.9 | 11.5 | 1.01 | None | 328 | 295 | 10 |
| Example 23 | 5.9 | 11.5 | 1.04 | Wrinkles | 332 | 292 | 12 |
| Comp. Ex. 15 | 5.9 | 11.5 | | * | | | |
| Comp. Ex. 16 | 5.9 | 11.5 | | * | | | |
| Comp. Ex. 17 | 5.9 | 11.5 | | * | | | |
| Comp. Ex. 18 | 9.6 | 22.1 | 0.92 | None | 278 | 247 | 11 |
| Comp. Ex. 19 | 9.6 | 22.1 | 0.95 | None | 280 | 252 | 10 |
| Comp. Ex. 20 | 9.6 | 22.1 | 0.98 | None | 285 | 257 | 10 |
| Comp. Ex. 21 | 9.6 | 22.1 | 1.01 | Wrinkles | 287 | 255 | 11 |
| Comp. Ex. 22 | 9.6 | 22.1 | | * | | | |
| Comp. Ex. 23 | 9.6 | 22.1 | | * | | | |
| Comp. Ex. 24 | 9.6 | 22.1 | | * | | | |
| Comp. Ex. 25 | 9.6 | 22.1 | | * | | | |

*: Difficulties in production

Figure 5A:
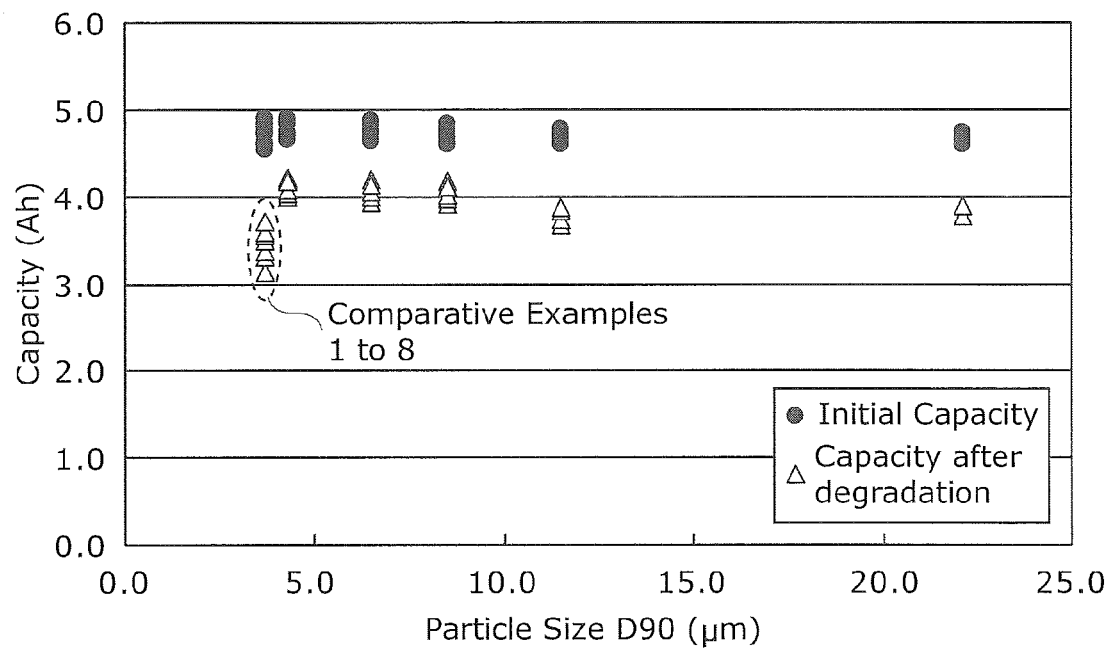
FIG. 5A is a graph showing the initial capacity and the capacity after degradation when the particle size D90 is varied.
Figure 5B:
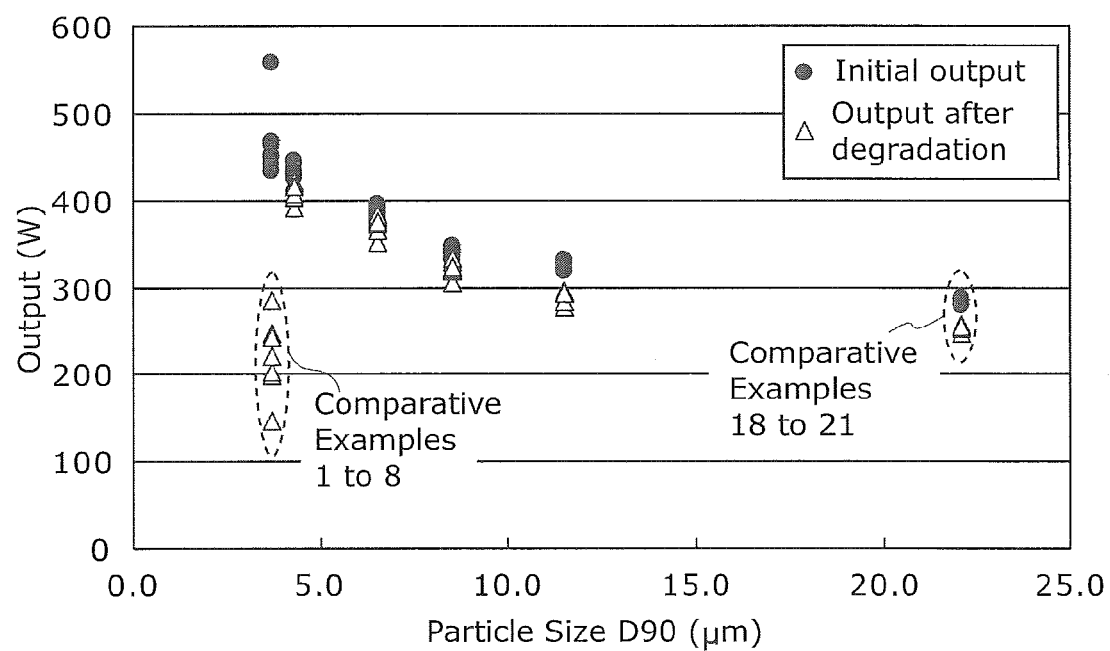
FIG. 5B is a graph showing the initial output and the output after degradation when the particle size D90 is varied.
Figure 6:
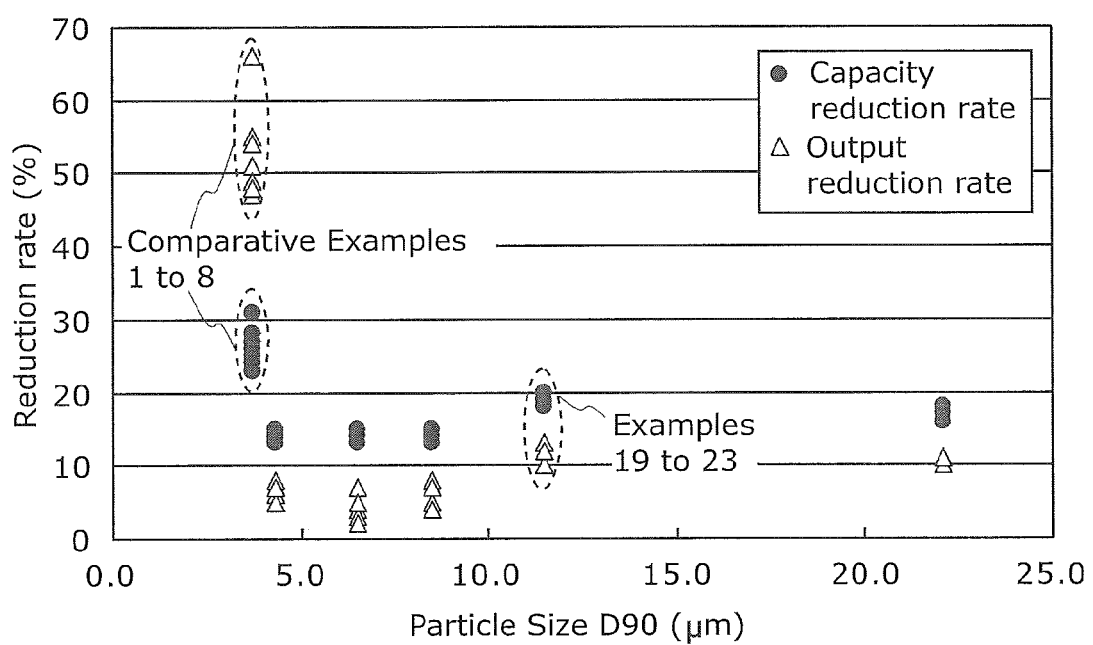
FIG. 6 is a graph showing the capacity reduction rate and the output reduction rate when the particle size D90 is varied.

FIG. 5A is a graph showing the initial capacity and the capacity after degradation when the particle size D90 is varied. FIG. 5B is a graph showing the initial output and the particle size D90 when the output after degradation is varied. FIG. 6 is a graph showing the capacity reduction rate and the output reduction rate when the particle size D90 is varied.

As shown in Table 2 above and FIG. 5B, the initial outputs and the outputs after degradation in Comparative Examples 18 to 21 (particle size D90: 22.1 μm) are lower than those in Examples 1 to 23. Namely, reduction in the output can be suppressed to attain higher output at a particle size D90 of 11.5 μm or less.

As shown in Tables 1 and 2 above FIGS. 5A and 5B, the capacities after degradation and the outputs after degradation in Comparative Examples 1 to 8 (particle size D90: 3.7 μm) are significantly lower than those in Examples 1 to 23. As shown in FIG. 6, the capacity reduction rates and the output reduction rates in Comparative Examples 1 to 8 (particle size D90: 3.7 μm) are significantly higher. Namely, reduction in the capacity and output due to degradation can be suppressed to attain high durability at a particle size D90 of 4.3 μm or more.

As shown in Tables 1 and 2 above, at a particle size D90 of 4.3 μm or more and 11.5 μm or less, the particle size D50 is 2.7 μm or more and 5.9 μm or less. Accordingly, at a particle size D50 of 2.7 μm or more and 5.9 μm or less, higher output and higher durability can be attained.

Furthermore, shown in FIG. 6, the capacity reduction rates and the output reduction rates in Examples 19 to 23 (particle size D90: 11.5 μm) are significantly higher than those in Examples 1 to 18. Namely, at a particle size D90 of 8.5 μm or less, reduction in the capacity and the output due to degradation can be suppressed to attain high durability.

Figure 7A:
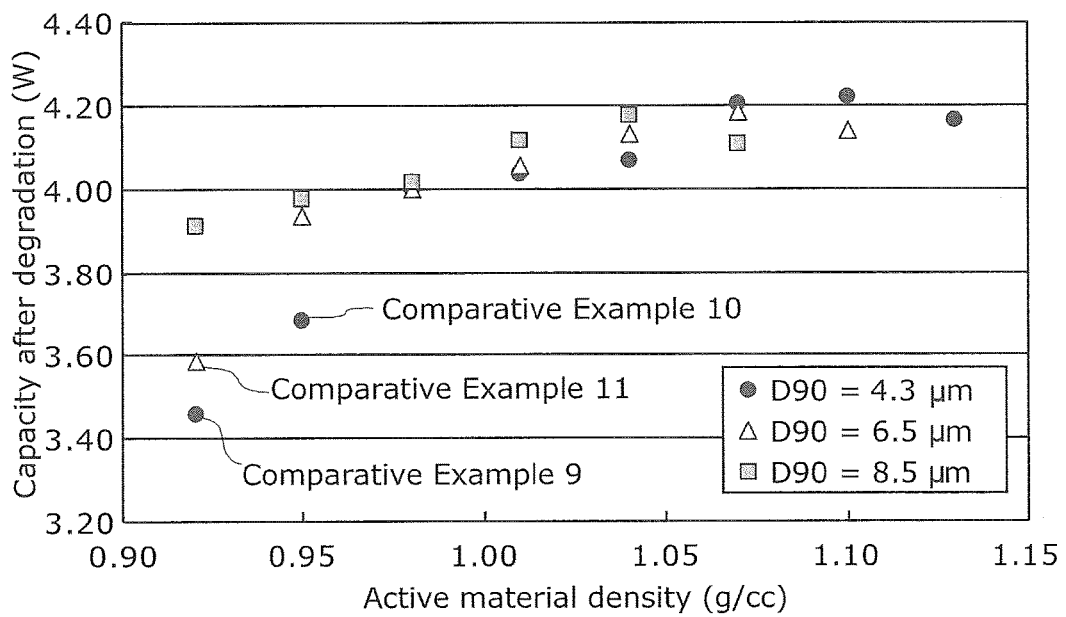
FIG. 7A is a graph showing the capacity after degradation when the density of a negative electrode active material is varied.
Figure 7B:
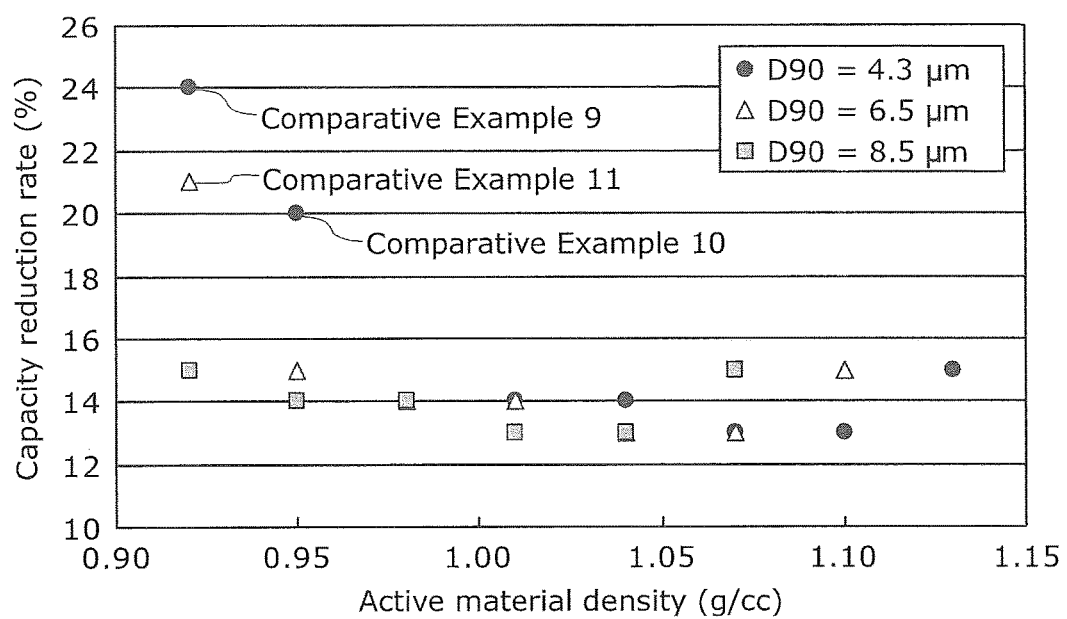
FIG. 7B is a graph showing the capacity reduction rate when the density of a negative electrode active material is varied.
Figure 8A:
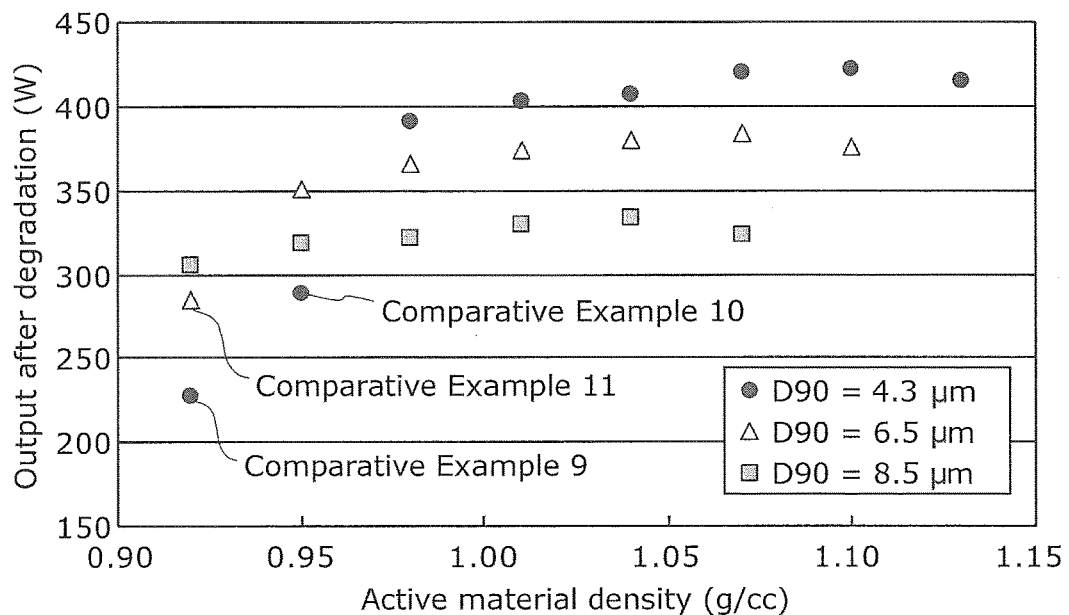
FIG. 8A is a graph showing the output after degradation when the density of a negative electrode active material is varied.
Figure 8B:
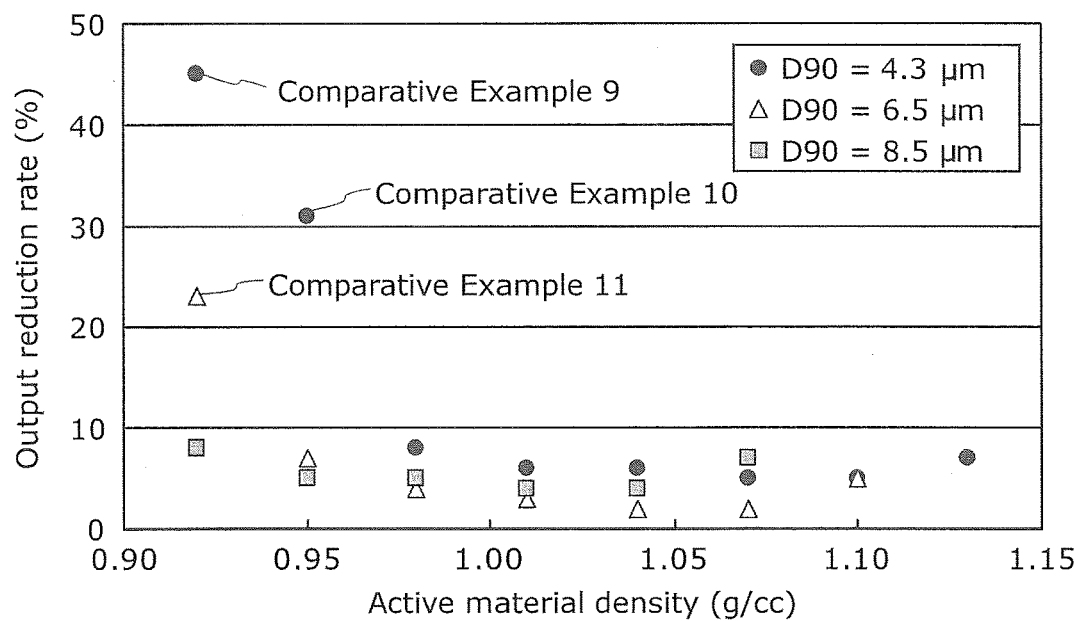
FIG. 8B is a graph showing the output reduction rate when the density of a negative electrode active material is varied.

FIG. 7A is a graph showing the capacity after degradation when the density of the negative electrode active material is varied, and FIG. 7B is a graph showing the capacity reduction rate when the density of the negative electrode active material is varied. FIG. 8A is a graph showing the output after degradation when the density of the negative electrode active material is varied, and FIG. 8B is a graph showing the output reduction rate when the density of the negative electrode active material is varied.

As shown in Tables 1 and 2 above and FIGS. 7A to 8B, at a particle size D90 of 4.3 μm, the capacities after degradation and the outputs after degradation in Comparative Examples 9 and 10 (active material density: 0.92 g/cc and 0.95 g/cc, respectively) are significantly lower than those in Examples 1 to 6, while the capacity reduction rates and the output reduction rates in Comparative Examples 9 and 10 are significantly higher those in Examples 1 to 6. Namely, when the particle size D90 is 4.3 μm and the active material density is 0.98 g/cc or more, reduction in the capacity and the output due to degradation can be suppressed to attain higher durability.

As shown in Tables 1 and 2 above, when the particle size D90 is 4.3 μm and the active material density is 1.13 g/cc or less, wrinkles can be prevented from being produced in the negative electrode to avoid difficulties in production of the electrode assembly, or reduction in durability can be prevented.

Similarly, at a particle size D90 of 6.5 μm, the capacity after degradation and the output after degradation in Comparative Example 11 (active material density: 0.92 g/cc) are significantly lower than those in Examples 7 to 12, and the capacity reduction rate and the output reduction rate in Comparative Example 11 are significantly higher than those in Examples 7 to 12. Namely, when the particle size D90 is 6.5 μm and the active material density is 0.95 g/cc or more, reduction in the capacity and the output due to degradation can be suppressed to attain higher durability.

As shown in Tables 1 and 2, when the particle size D90 is 6.5 μm and the active material density is more than 1.10 g/cc, the negative electrode is wrinkled in Comparative Example 12 to cause difficulties in production of the electrode assembly. Namely, when the particle size D90 is 6.5 μm and the active material density is 1.10 g/cc or less, wrinkles can be prevented from being produced in the negative electrode to avoid difficulties in production of the electrode assembly, or reduction in durability can be prevented.

Similarly, when the particle size D90 is 8.5 μm and the active material density is 0.92 g/cc or more, reduction in the capacity and the output due to degradation can be suppressed to attain higher durability. When the particle size D90 is 8.5 μm and the active material density is more than 1.07 g/cc, wrinkles are produced in the negative electrode to avoid difficulties in production of the electrode assembly in Comparative Examples 13 and 14. Namely, when the particle size D90 is 8.5 μm and the active material density is 1.07 g/cc or less, wrinkles can be prevented from being produced in the negative electrode to cause difficulties in production of the electrode assembly, or reduction in durability can be prevented.

Figure 9A:
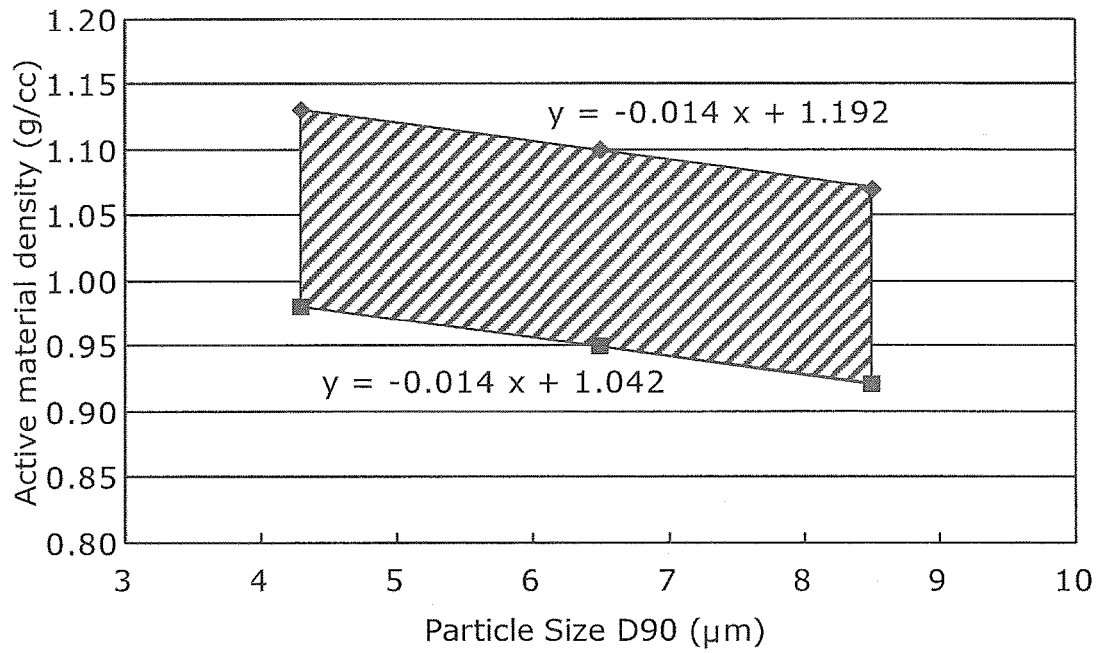
FIG. 9A is a graph showing the relation between the particle size D90 and the active material density.

The relation between the active material density and the particle size D90 described above is shown in FIG. 9A. FIG. 9A is a graph showing the relation between the particle size D90 and the active material density. Specifically, in the graph, the outer edges of the ranges of the particle size D90 and the active material density enabling higher output and higher durability are linearly approximated, and the range is diagonally shaded.

As shown in FIG. 9A, the diagonally shaded portion is a region that satisfies the relation (Mathematical Relation 1) $A1=-0.014 \times B1+C1$ (where $4.3 \leq B1 \leq 8.5$, and $1.04 \leq C1 \leq 1.20$) wherein the active material density (y-axis) is A1 g/cc and the particle size D90 (x-axis) is B1 μm.

Figure 9B:
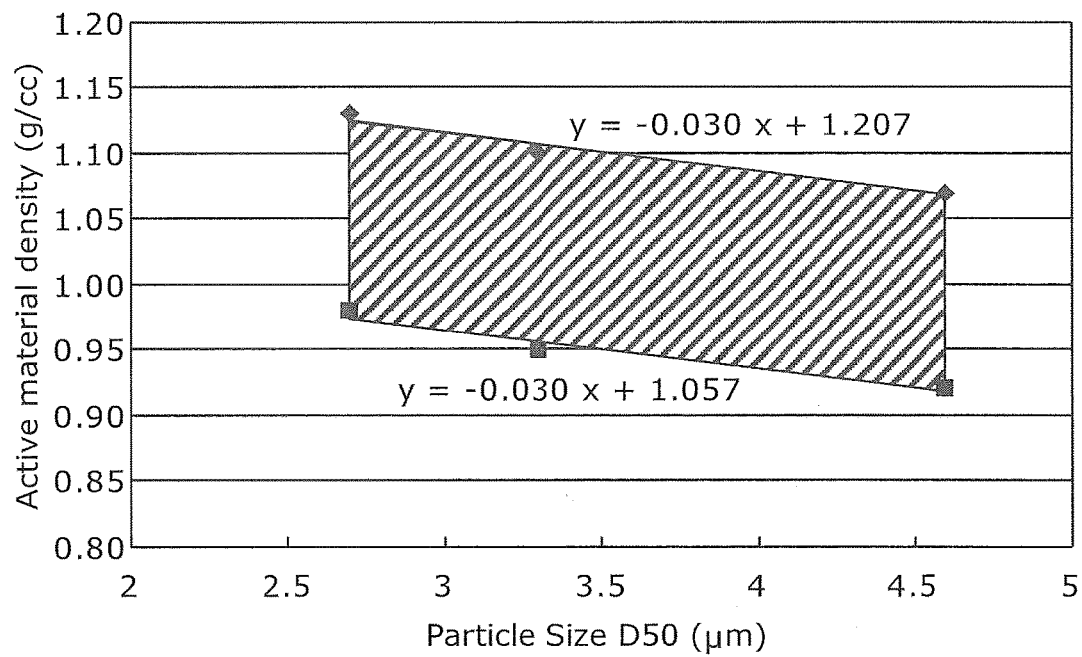
FIG. 9B is a graph showing the relation between the particle size D50 and the active material density.

FIG. 9B is a graph showing the relation between the particle size D50 and the active material density. Specifically, as the graph shows, the ranges of the particle size D50 and the active material density correspond to the ranges of the particle size D90 and the active material density shown in FIG. 9A, and are diagonally shaded.

As shown in FIG. 9B, the diagonally shaded portion is a region that satisfies the relation (Mathematical Relation 2) $A2=-0.003 \times B2+C2$ (where $2.7 \leq B2 \leq 4.6$, and $1.05 \leq C2 \leq 1.21$) wherein the active material density (y-axis) is A2 g/cc and the particle size D90 (x-axis) is B2 μm.

As above, as a result of intensive research, the present inventors found that an increased output and high durability can be attained when the non-graphitizable carbon is used as the negative electrode active material, the density of the negative electrode active material is 0.92 g/cc or more and 1.13 g/cc or less, and the particle size D90 is 4.3 μm or more and 11.5 μm or less. Namely, an excessively reduced density of the negative electrode active material will reduce current collecting properties and the like to significantly reduce the capacity and the output due to degradation, thereby reducing durability. An excessively increased density of the negative electrode active material will cause wrinkles in the negative electrode 420, leading to difficulties in production of the electrode assembly 400. When the negative electrode 420 having wrinkles is used to produce the electrode assembly 400, durability will also reduce. Thus, by controlling the density of the negative electrode active material within a suitable range, high durability can be attained while an increased capacity and output are kept. Moreover, an excessively reduced particle size of the negative electrode active material will significantly reduce the capacity and output due to degradation, thereby reducing durability. Numbers of coarse particles contained in the negative electrode active material become pillars to cause insufficient contact between the negative electrode active materials of such a reduced particle size when the positive electrode 410, the negative electrode 420, and the separators 431 and 432 are stacked and pressed to reduce the thickness of the layer. The insufficient contact will reduce the output. Thus, by controlling the particle size D90 of the negative electrode active material within a suitable range, high durability can be attained while an increased capacity and output are kept.

As a result of intensive research, the present inventors also found that when the density of the negative electrode active material and the particle size D90 satisfy Mathematical Relation 1 above, a more increased output and higher durability can be attained. Namely, higher durability can be attained while a more increased capacity and higher output are kept wherein the particle size D90 of the negative electrode active material is in the range of 4.3 μm or more and 8.5 μm or less and the particle size D90 is 4.3 μm and the density of the negative electrode active material is 0.98 g/cc or more and 1.13 g/cc or less, the particle size D90 is 6.5 μm and the density is 0.95 g/cc or more and 1.10 g/cc or less, and the particle size D90 is 8.5 μm and the density is 0.92 g/cc or more and 1.07 g/cc or less.

Moreover, when the particle size D90 of the negative electrode active material is 4.3 μm or more and 11.5 μm or less, the particle size D50 is 2.7 μm or more and 5.9 μm or less. Then, at a particle size D50 in the range above, an increased output and high durability can be attained.

Moreover, when the particle size D90 of the negative electrode active material is 4.3 μm or more 8.5 μm or less, the particle size D50 is 2.7 μm or more and 4.6 μm or less. Then, when the density of the negative electrode active material and the particle size D50 satisfy Mathematical Relation 2 above, a more increased output and higher durability can be attained. Namely, higher durability can be attained while a more increased capacity and higher output are kept wherein the particle size D50 is in the range of 2.7 μm or more and 4.6 μm or less and the particle size D50 is 2.7 μm and the density of the negative electrode active material is 0.98 g/cc or more and 1.13 g/cc or less, the particle size D50 is 3.3 μm and the density is 0.95 g/cc or more and 1.10 g/cc or less, and the particle size D50 is 4.6 μm and the density is 0.92 g/cc or more and 1.07 g/cc or less.

Moreover, the negative electrode current collector 130 is joined to the region having no negative electrode active material layer 421a to fix the negative electrode 420 to the negative electrode current collector 130. When the density of the negative electrode active material is high, wrinkles are produced between the region having the negative electrode active material layer 422 and the region having no negative electrode active material layer 421a. According to the energy storage device 10, in contrast, by controlling the density of the negative electrode active material within a suitable range, the wrinkles to be produced in the negative electrode 420 can be suppressed, avoiding difficulties to produce the electrode assembly 400 due to wrinkles produced in the negative electrode 420.

Moreover, because the non-aqueous electrolyte contains the coating forming material for the negative electrode 420, a more increased output and higher durability can be attained.

Moreover, a plurality of the energy storage devices 10 is combined to form an energy storage unit (module).

Figure 10:
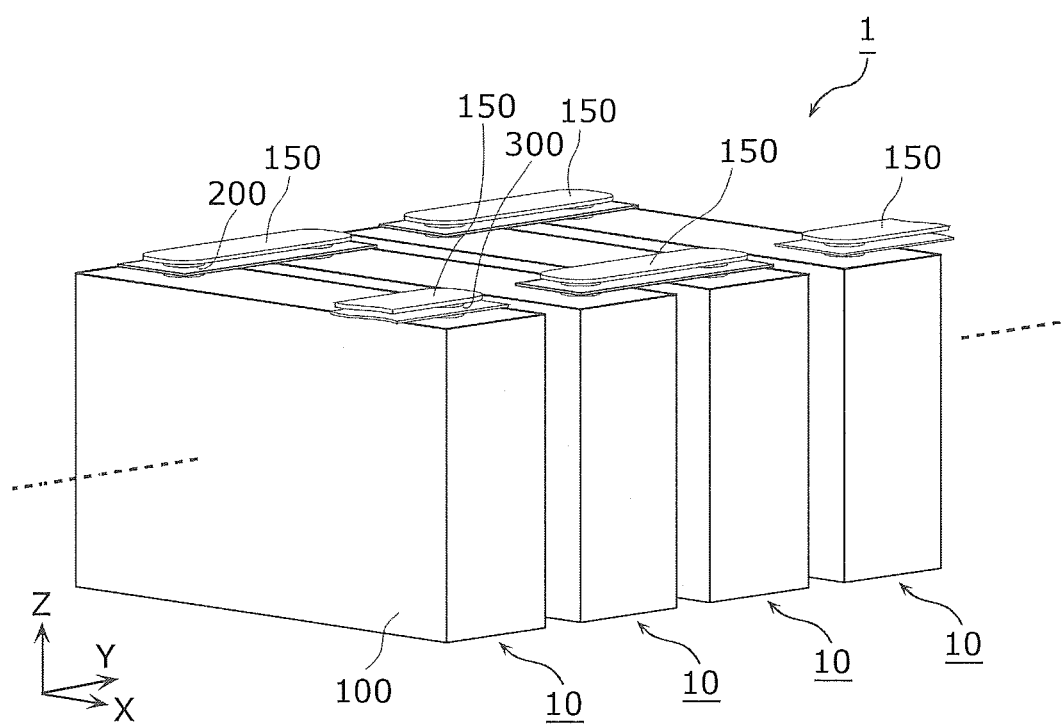
FIG. 10 is a perspective view showing an appearance of an energy storage unit according to the embodiment of the present invention.

FIG. 10 is a perspective view of an appearance of an energy storage unit 1 according to the embodiment of the present invention.

As shown in FIG. 10, the energy storage unit 1 includes a plurality of the energy storage devices 10 and at least one bus bar 150 that electrically connects two of the energy storage devices 10.

Namely, the energy storage unit 1 includes a plurality of bus bars 150. Each of the bus bars 150 electrically connects the positive (or negative) electrode in one of the energy storage devices 10 to the negative (or positive) electrode in its adjacent energy storage device 10 in the energy storage devices 10. As a result, these energy storage devices 10 are connected in series.

The energy storage unit 1 may include an exterior casing that accommodates the energy storage devices 10 and a control board for monitoring the charge and discharge states of the energy storage devices 10.

As above, the energy storage unit 1 according to the embodiment of the present invention can attain the same effects as those of the energy storage device 10 to attain an increased output and higher durability.

As above, the energy storage device 10 and energy storage unit 1 according to the embodiment of the present invention have been described, but the present invention will not be limited to the embodiment. Namely, the embodiment disclosed here is only an example with all respects, and should not be considered as limitative. It is intended that the scope of the present invention is specified by the scope of Claims not by the description above, and meaning equivalent to the scope of Claims and all modifications within the scope are included.

For example, in the embodiment, the non-aqueous electrolyte contains the coating forming material as the additive, but the non-aqueous electrolyte may not contain the additive. Without the additive, an increased output and higher durability can also be attained.

Alternatively, the negative electrode active material may include not only non-graphitizable carbon (hard carbon) but also soft carbon or graphite, for example. The effects of the present invention are attained by the negative electrode active material including hard carbon as the main component. For example, 95% or more of hard carbon is preferred.

The invention claimed is:

1. A lithium ion battery, comprising:
a positive electrode;
a negative electrode;
a separator disposed between the positive electrode and the negative electrode; and
a non-aqueous electrolyte,
wherein the negative electrode includes a negative electrode active material layer comprising:
a binder soluble in an organic solvent; and
a negative electrode active material consisting of a non-graphitizable carbon,
wherein a negative electrode active material weight per unit volume with respect to the negative electrode active material layer of the negative electrode active material as a whole is 0.92 g/cc or more and 1.13 g/cc or less, and a size of negative electrode active material particles consists of a particle size D90 of 4.3 µm or more and 11.5 µm or less, the particle size D90 being a particle size in a particle size distribution in which a cumulative volume is 90%.

2. The lithium ion battery according to claim 1, wherein a relation $A1=-0.014 \times B1+C1$ (where $4.3 \leq B1 \leq 8.5$, and $1.04 \leq C1 \leq 1.20$) is satisfied, wherein the negative electrode active material weight per unit volume of the negative electrode active material layer is A1 g/cc and the particle size D90 of the negative electrode active material is B1 µm.

3. The lithium ion battery according to claim 1, further comprising:
a negative electrode terminal; and
a negative electrode current collector that electrically connects the negative electrode terminal to the negative electrode,
wherein the negative electrode includes a region in which the negative electrode active material layer is not formed, and
wherein the negative electrode current collector is joined to the region to electrically connect the negative electrode terminal to the negative electrode.

4. The lithium ion battery according to claim 1, wherein the non-aqueous electrolyte contains an additive, and the additive comprises a coating forming material for forming a coating on a surface of the negative electrode.

5. An energy storage unit comprising a plurality of energy storage devices each comprising the lithium ion battery according to claim 1.

6. The lithium ion battery according to claim 1, wherein the binder comprises polyvinylidene fluoride.

7. The lithium ion battery according to claim 1, wherein the negative electrode active material has the particle size D90 of 4.3 µm or more and 8.5 µm or less.

8. The lithium ion battery according to claim 7, wherein the negative electrode active material has the negative electrode active material weight per unit volume with respect to the negative electrode active material layer of 0.98 g/cc or more and 1.07 g/cc or less.

9. The lithium ion battery according to claim 1, wherein the negative electrode active material has a particle size D50 of 2.7 µm or more and 4.6 µm or less.

10. The lithium ion battery according to claim 9, wherein the negative electrode active material has the negative electrode active material weight per unit volume with respect to the negative electrode active material layer of 0.98 g/cc or more and 1.07 g/cc or less.

* * * * *